United States Patent
Cheng et al.

(10) Patent No.: US 7,673,345 B2
(45) Date of Patent: Mar. 2, 2010

(54) PROVIDING EXTENDED MEMORY PROTECTION

(75) Inventors: Antonio S. Cheng, Portland, OR (US); Francis X. McKeen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1339 days.

(21) Appl. No.: 11/095,719

(22) Filed: Mar. 31, 2005

(65) Prior Publication Data
US 2006/0225135 A1    Oct. 5, 2006

(51) Int. Cl.
G06F 12/00    (2006.01)
G06F 17/30    (2006.01)

(52) U.S. Cl. .................... 726/26; 711/105; 711/163

(58) Field of Classification Search ........... 711/105, 711/163, 207; 710/52; 726/26
See application file for complete search history.

(56) References Cited

U.S. PATENT DOCUMENTS

| 6,795,905 B1 | 9/2004 | Ellison et al. ............... 711/163 |
| 2005/0044292 A1 | 2/2005 | McKeen ...................... 710/51 |
| 2005/0138263 A1 | 6/2005 | McKeen ........................ 711/1 |

FOREIGN PATENT DOCUMENTS

| CN | 1585932 | 2/2005 |
| DE | 198 28 056 A1 | 12/1999 |
| WO | WO 03/042839 | 5/2003 |

OTHER PUBLICATIONS

An ECC based vector space key sharing scheme; Shichun Pang; Shufen Liu; Pervasive Computing and Applications, 2006 1st International Symposium on Aug. 3-5, 2006 pp. 524-527.*
Encryption and Decryption with Space Transformation for Bi-directional Association; Chien-Pen Chuang; Tin-Ying Huang; Li-Chi Yeh; Embedded and Ubiquitous Computing, 2008. EUC '08. IEEE/IFIP International Conference on vol. 2, Dec. 17-20, 2008 pp. 121-126.*
Pair-wise network topology authenticated hybrid cryptographic keys for Wireless Sensor Networks using vector algebra; Pugliese, M.; Santucci, F.; Mobile Ad Hoc and Sensor Systems, 2008. MASS 2008. 5th IEEE International Conference on Sep. 29, 2008-Oct. 2, 2008 pp. 853-859.*
Office Action from German Patent and Trademark Office dated Dec. 7, 2006, with English translation.
Larson, E. and T. Austin. *High Coverage Protection of Input-Related Security Faults*. in the 12th Annual USENIX Security Symposium (SEC-2003), Aug. 2003. pp. 121-136. (http://www.eecs.umich.edu/~taustin/papers/USENIX-SEC03-bounds.pdf).

(Continued)

*Primary Examiner*—David Y Jung
(74) *Attorney, Agent, or Firm*—Trop, Pruner & Hu, P.C.

(57) ABSTRACT

In one embodiment, the present invention provides for extended memory protection for memory of a system. The embodiment includes a method for associating a protection indicator of a protection record maintained outside of an application's data space with a memory location, and preventing access to the memory location based on the status of the protection indicator. In such manner, more secure operation is provided, as malicious code or other malware is prevented from accessing protected memory locations. Other embodiments are described and claimed.

21 Claims, 6 Drawing Sheets

OTHER PUBLICATIONS

*Execute Disable Bit Functionality* Intel Corporation. 2005. (http://www.intel.com/business/bss/infrastructure/security/xdbit.htm).

*Execute Disable Bit Functionality Blocks Malware Code Execution.* Intel Corporation. (http://cache-www.intel.com/cd/00/00/14/93/149307_149307.pdf). Jun. 24, 2004.

German Patent and Trademark Office, Office Action dated Feb. 20, 2008 with English language translation in a related application.
German Patent and Trademark Office, Office Action dated Mar. 5, 2009 with English language translation in a related application.
German Patent Office, Office Action dated Mar. 5, 2009, in a related application.

* cited by examiner

PROVIDING EXTENDED MEMORY PROTECTION

BACKGROUND

The computer industry has suffered from numerous security vulnerabilities over the past several years, and the number of vulnerabilities continues to rise. More of these vulnerabilities have been turned into attacks which compromise the integrity of the machine under attack. The root cause of many of these attacks is programming errors made when creating or modifying code.

Several solutions have been attempted. Courses on writing secure code have been run by many groups. A managed run time environment (MRTE) is effective where used, but does not encompass the entire programming space. None of the efforts has managed to reverse the downward spiral of vulnerability, attack, and patch. Reducing the number of programming errors would result in reducing the number of security vulnerabilities and improve system integrity.

One common vulnerability is a buffer overflow attack. One example of such an attack occurs when malicious code overwrites a return address of a function that is stored in a stack. Upon returning from the function, a modified return address is pushed into the instruction pointer (extended instruction counter (EIP) register). This modified return address may cause execution of malicious code and/or a stack execution error. Such an attack is typically enabled by poor programming practices, such as unchecked buffer transfers. In contrast, a well-structured program maps memory into structured portions, including a text portion to include program code, a data segment to store initialized and uninitialized global data, and a portion shared by the stack and heap. The stack may be used to store function call-by arguments, local variables and values of selected registers, such as the EIP register. The heap holds dynamic variables. Poor programming practices may cause these segments to be overwritten.

There are other places where unchecked buffers can reside. An example of such a place is a buffer overflow to the heap memory. Heap memory is memory allocated from a common pool and used by a program to store variable and other run time data.

A need thus exists to provide for more protection from security vulnerabilities.

DETAILED DESCRIPTION

Figure 1:
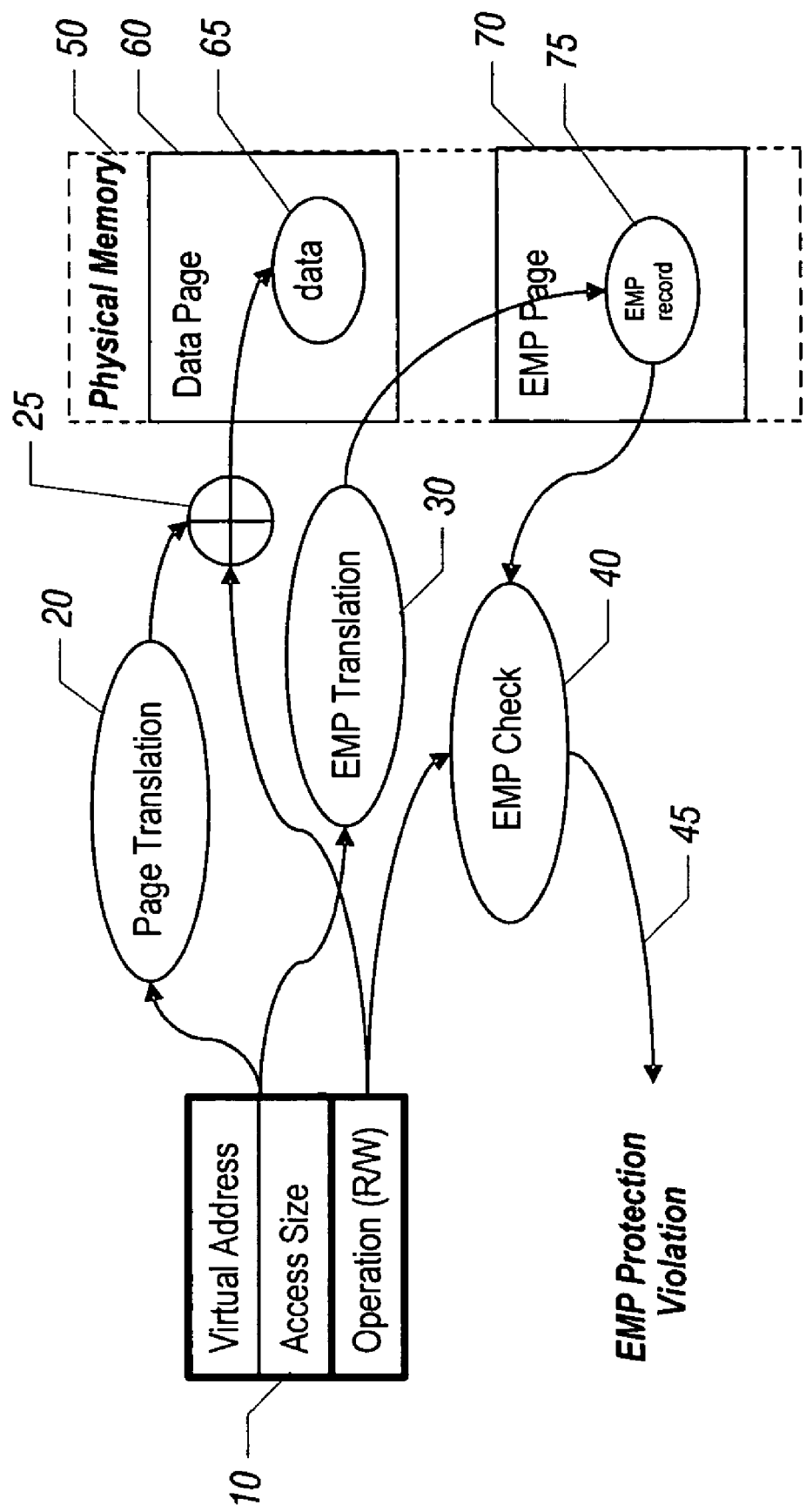
FIG. 1 is a flow diagram of a method of checking memory accesses in accordance with an embodiment of the present invention.

Embodiments of the present invention provide a mechanism to mark memory locations as non-accessible. If a program attempts to access a protected memory location, the mechanism may signal a memory access violation. That is, memory protection in accordance with an embodiment of the present invention may provide a fixed size breakpoint associated with a memory location. Locations may be protected by marking the location as inaccessible for certain types of operations. In such manner, more secure operation occurs.

In various embodiments, attribute bits are defined to provide protection of memory locations. These bits indicate whether access can be granted for read or write operations. These attributes may provide extended memory protection (EMP) by providing access control on a variable, which may be defined as 32 bits of memory in some embodiments. A program generated by an EMP-enabled compiler will set the attributes to provide the correct level of support. Legacy programs may operate seamlessly by not setting any of these attribute bits.

It is to be understood that the properties of memory protection may be architecture-specific. The choices may include, for example, the type of access protection provided: read-protection, write-protection, execute-protection, or some mixed selection of all three; the address range covered by each attribute bit; the ability to alias or overlap with other attributes; the operational address space: virtual or physical; and a protection-walk process to translate an address to the corresponding protection value.

In one embodiment, four states are defined based on read/write restrictions, each expressed by a bit. These states may correspond to a buffer usage model having four states, namely unallocated, uninitialized, initialized, and locked. This model can be mapped into the following states, respectively, no_read-no_write; no_read-write_ok; read_okay-write_ok; and read_ok-no_write. As an example, the no_read-no_write state may be defined by setting read and write protection bits. Thus an exception may be generated if a read or write occurs to a location having those protection bits set.

EMP information may be maintained in main memory and may correspond directly with each addressable memory element in the machine. That is, each addressable memory element may have a set of EMP attributes associated with it. The EMP information may be managed as attribute pages in memory. These pages are not accessible in the virtual address space of the program, but instead may be accessed by a special instruction. The attribute bits may be checked on every memory access. If the bits indicate a restricted access location, a memory access violation is generated.

In virtual memory paging systems, programs make memory references in a logical address space. The logical address is then transformed via segmentation into a linear or virtual address. Finally, a processor's paging mechanism translates the virtual address into a physical address corresponding to where the data is stored in physical memory. If a virtual address-based EMP is implemented and enabled, the processor makes an additional translation from the virtual address into an EMP restriction record stored in a separate EMP physical address space.

Referring now to FIG. 1, shown is a flow diagram of a method of checking memory accesses in accordance with an embodiment of the present invention. As shown in FIG. 1, a data access request 10 is received in a processor. Data access request 10 includes a virtual address, an access size and a type of operation (e.g., a read (R) or a write (W) operation). The virtual address information is provided to a page translation mechanism 20 and an EMP translation mechanism 30. These translation mechanisms translate the virtual address information from data access request 10 into a physical address space.

As shown in FIG. 1, the physical address obtained by page translation mechanism 20 is provided to a logical operator 25, which combines the physical address with the operation type to thus access data in a physical memory 50. More specifically, using the physical address obtained, desired data 65 within a data page 60 may be accessed.

However, prior to being able to access desired data 65, in embodiments in which EMP is enabled, it may first be determined whether the memory location of data 65 is permitted to be accessed. For example, a read or write operation may be prevented if EMP is enabled and access to the requested data 65 is restricted.

That is, the virtual address information from data access request 10 is provided to EMP translation mechanism 30, where the virtual address is translated into a physical address corresponding to an EMP or restriction record 75 (associated with data 65) stored in an EMP page 70 (associated with data page 60). The accessed EMP record 75 is provided to an EMP check mechanism 40, where it may be determined whether access to requested data 65 is permitted. For example, one or more bits of EMP record 75 may indicate that access to the corresponding requested data 65 is not permitted. If such access is not permitted, EMP check mechanism 40 may generate an EMP protection violation (EPV) on a signal line 45. Accordingly, access to data 65 is prevented.

Thus if EMP write protection is set for a given virtual address and there is a data write attempt to that address, the processor may raise an EMP protection violation (EPV) exception. An EMP read protection has the same effect on data read accesses. Memory reads due to code fetches may not be considered a data read access, in some embodiments. In various embodiments, an EMP exception handler may be used to recover from the protection violation in a safe manner.

In various embodiments, checking of EMP restrictions is privilege level agnostic. That is, if an EMP write protection is set for a particular memory location, all write attempts to that location will lead to an EPV exception regardless of the current program's privilege level. In these embodiments, all page restrictions must still be satisfied for the reference to succeed. EMP exceptions do not occur if the page level protections do not allow access at the current privilege level.

An EMP flag may be included within a processor control structure such as a control register (e.g., control register 4 (CR4)). In some embodiments, the default setting of the EMP flag is zero (cleared), meaning that there is no EMP restriction check for any data accesses. When the EMP restriction checking is disabled globally, there is no need for the processor to perform EMP address translations on the virtual address of every data access. To enable EMP restriction checking, the EMP flag may be set to 1.

The EMP physical address space is not visible to software programs in virtual address space. Accordingly, an operating system (OS) may prevent exposing EMP physical addresses through regular paging mechanisms. To modify EMP restriction attributes, a software program may use an instruction to change the memory attributes, such as moving memory restrictions (e.g., a MOVMR instruction), which may move the memory attribute (EMP restriction record) into the EMP memory in physical space.

The EMP protection violation (EPV) may have its own exception vector identifier (ID). The processor raises an EPV exception if a data access fails the EMP restriction check. In addition, an EPV exception may also be raised during a MOVMR instruction. An EPV may be considered an instruction execution fault. The resulting interrupt is precise and prevents the instruction from executing.

When the EPV exception is raised, it places an error code onto the current stack. The error code may include a number of error status bits. Each bit in the error code may be used to indicate a different cause of the EPV exception. When an EPV is raised, the source virtual address that initiated the EMP translation or restriction check is stored in a specified location, for example, within a control register (e.g., CR2).

In various embodiments, such an EMP mechanism may be used in a variety of ways to increase system integrity. While some embodiments may protect stack variables and parameters, as well as heap variables, it is to be understood that the scope of the present invention is not so limited.

In the following example, a byte-size discrete write-protection on a virtual address model is used. In such an embodiment, for each byte of addressable data (in a virtual address space), there is a write protect attribute bit associated therewith. If this bit is set, any attempt to write to this location may cause an architectural exception. For each virtual address page, the operating system (OS) may allocate a protection record, such as a vector of a corresponding size (e.g., 1 bit per byte) in a separate virtual memory location. In one embodiment, each EMP restriction record describes the data access restrictions for 32 bits (4 bytes) of virtual addresses. Multiple EMP restriction records may be used if a data access covers multiple 4-byte data chunks. The location of this vector in physical memory may be provided through a protection-walk mechanism. In one embodiment, this mechanism may be similar to a page walk mechanism, with the last entry pointing to the vector base address, instead of the physical page. In other embodiments, different translation schemes, including a hash table with a software assist are also possible.

While described herein as byte-size write protection, in other embodiments read protection and other protection granularities may be implemented. Restriction records may also be referred to herein as vectors. A vector may be protected from modification by regular store operations. As an example, a special instruction may be used by user applications to modify a particular bit within a vector. This instruction may be referred to as a "set/clear protection" instruction. Given a virtual address, the special set or clear instruction can be used to modify the appropriate attribute bit without causing an exception.

The stack can be protected from buffer overflows and other dangerous overwrites by marking key memory locations such as the return address as inaccessible. As an example, a compiler may emit code upon entry to a routine to mark the return address as inaccessible. Should the routine attempt a write past the assigned variables and into the return address, then an error is detected using an EMP mechanism. The error may be reported as a memory access violation. As a result, the write does not occur, and an error handler may determine an appropriate manner of resolving the error, unlike buffer overflow detection schemes which only detect an overwrite after the buffer has already been corrupted.

The heap memory may be protected in two ways. Unallocated or deallocated memory may be marked as unallocated. Any reference to those locations will generate a fault. Further, the heap manager can mark key pointers and internal variables as inaccessible.

Figure 2:
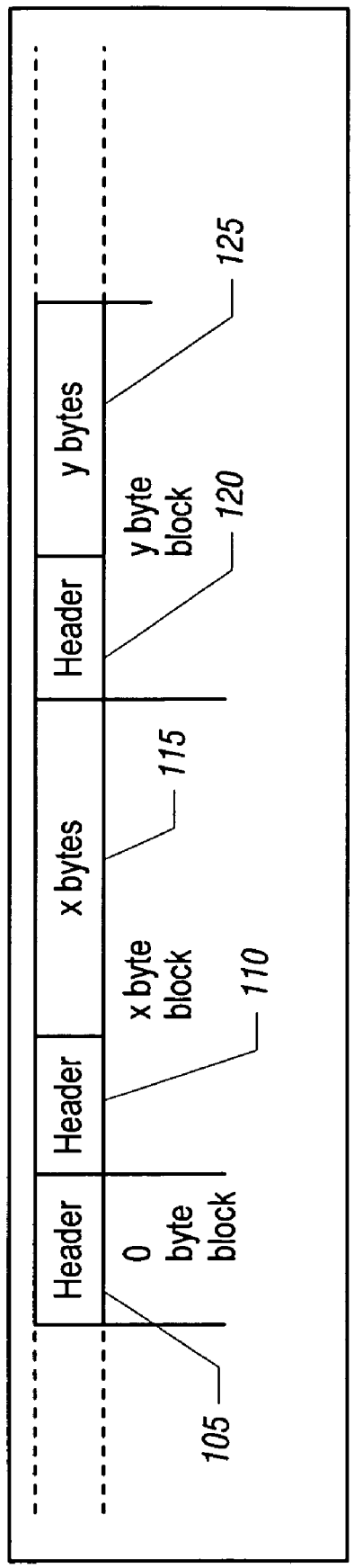
FIG. 2 is a block diagram of a buffer that may be used in accordance with an embodiment of the present invention

For example, referring now to FIG. 2, shown is a block diagram of a buffer that may be used in accordance with an embodiment of the present invention. The buffer may be within a data heap or a stack structure, and as shown in FIG. 2, may include multiple data blocks including a first data block 115 that is x bytes long and second data block 125 that is y bytes long. The two blocks 115 and 125 each have a block header associated therewith. Specifically, block 115 includes a header 110 and block 125 includes a header 120. Additionally, a header 105 is present for a zero byte block.

In a buffer overflow attack, malicious code overwrites the buffer from one allocated block to a next block and modifies the data therein. To avoid such buffer overflows, embodiments of the present invention may protect the block headers of each buffer block using protection records. For example, headers 105, 110, and 120 of FIG. 2 may each have protection indicators associated therewith that are set to indicate that these memory locations are inaccessible to write and/or read operations. These protection indicators may be stored in one or more protection vectors or records, for example, EMP record 75 of FIG. 1.

Figure 3:
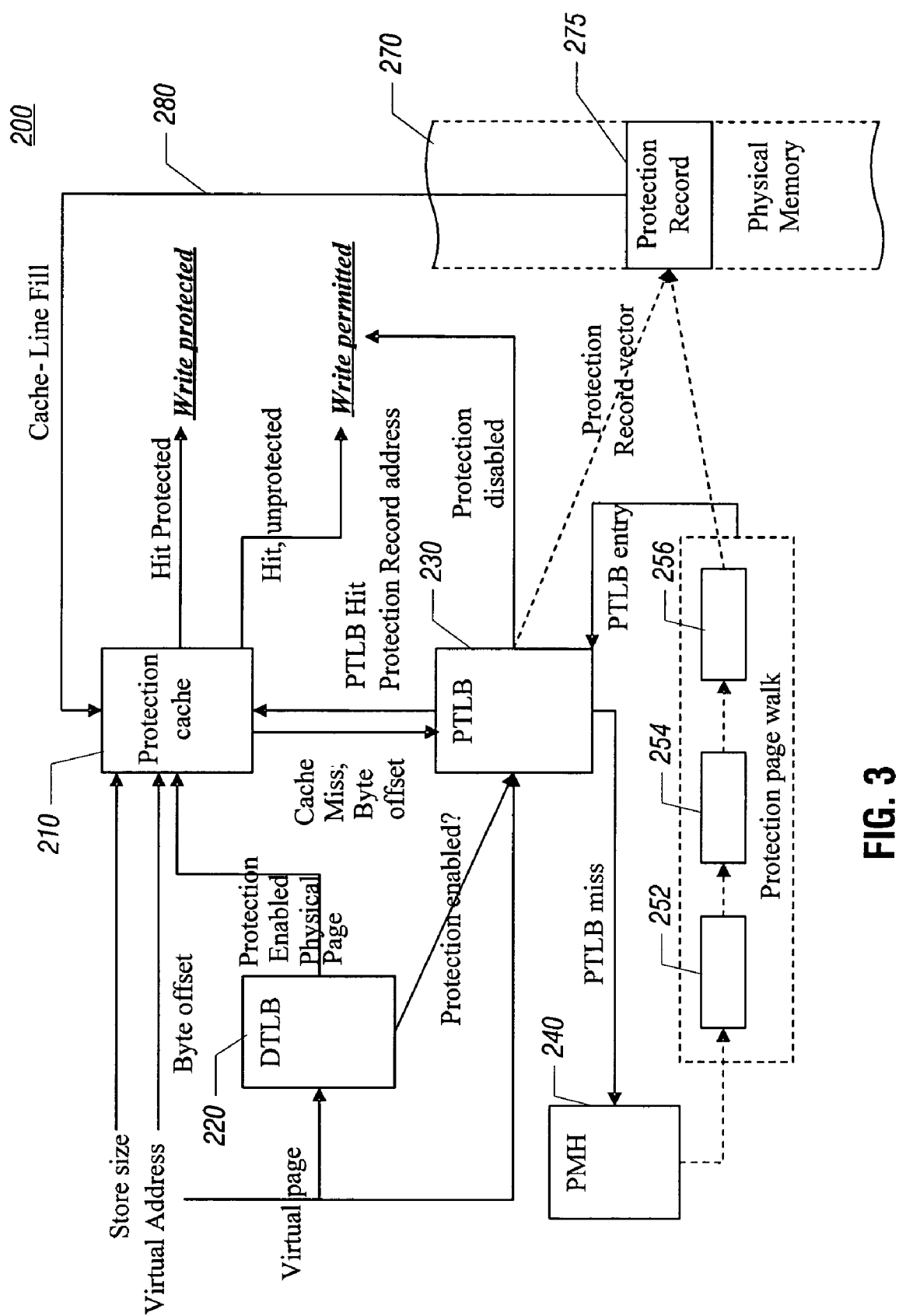
FIG. 3 is a block diagram of various pipeline structures in accordance with an embodiment of the present invention.

To minimize a performance penalty due to extra memory accesses for protection information, a protection cache and a protection translation lookaside buffer (PTLB) may be included within a memory pipeline. Referring now to FIG. 3, shown is a block diagram of various pipeline structures in accordance with an embodiment of the present invention. As shown in FIG. 3, a microprocessor 200 may include various processor resources to enable storage and checking of protection data.

In the embodiment of FIG. 3, processor 200 may include a protection cache 210 that is used to store a subset of the EMP records located in physical memory. In such manner, these most recently or frequently accessed protection records can be quickly obtained without incurring latencies in obtaining the information from a memory hierarchy.

As further shown in FIG. 3, a data translation lookaside buffer (DTLB) 220 is present to store copies of data address translations. Similarly, a PTLB 230 is present to store translations from a virtual address to a physical address of recently accessed protection records. Each of these structures 210, 220 and 230 are coupled to receive a virtual address, e.g., corresponding to a store operation. A physical memory 270 is coupled to these pipeline structures. In various embodiments the EMP structures may be designed similarly to microarchitecture structures for paging functions. In some embodiments, circuitry for EMP and paging may be shared.

Protection cache 210 includes a data portion having cachelines of protection vectors. While the length of each cacheline is implementation-specific, the length may be a multiple of the data cache-line size to simplify handling of split addresses. Instead of using the protection vector address as a lookup tag, the original virtual address of a store operation received in the pipeline may be used to access a tag array of protection cache 210. The protection vector cache-line address is stored as the address check data in the cache. With this structure, cache lookup may occur in parallel with DTLB and PTLB lookups, or as soon as the virtual address of the store request is available.

DTLB 220 is coupled to provide an address page to protection cache 210, along with a protection enable signal. Similarly, DTLB 220 provides the protection enable signal to PTLB 230.

The results from DTLB 220 and PTLB 230 may be used to qualify the cache lookup result by comparing the results with the address check data. In addition to sending addresses to cache 210, either DTLB 220 or PTLB 230 can disable the cache lookup result. In such cases, the cache result is discarded with no output driven therefrom. The lookup result may disabled on a DTLB or PTLB miss, page level protection lookup disable (DTLB/PTLB), and processor state protection lookup disable, for example.

If the virtual address corresponding to a request is present in PTLB 230, the physical address of the EMP record is provided to protection cache 210, along with a PTLB hit signal. Analogous to a TLB for a page-walk, PTLB 230 may be used to speed up the protection-walk process. Also, like a TLB for a page-walk, PTLB 230 may be implementation specific. For example, it may be a single or multi-level TLB, it may support one or more walk tree definitions, and may also utilize a hash table with software assists.

A PTLB lookup may begin with the virtual page address of an incoming store operation, which may be done in parallel with a DTLB lookup. The data output of PTLB 230 is the physical start of the protection record for the corresponding page. The PTLB will send this address and a hit (or enable) signal to protection cache 210. The PTLB output is only relevant on a DTLB hit when DTLB 220 has enabled protection for that page. Using the virtual address received along with the information from DTLB 220 and PTLB 230, protection cache 210 may determine whether the requested EMP record is present. Thus a single virtual address can be used to obtain translations for a physical address for the store request (i.e., information in memory) and a physical address of the EMP record corresponding to the store request.

If the cache lookup output is not discarded, and all the protection bits corresponding to the store request are cached within its structure, a cache hit occurs. Besides reporting the cache hit, protection cache 210 may perform a logical "OR" operation on all the protection bits covered by the store request. That is, in addition to caching physical address translations, protection cache 210 performs bit indexing using a byte mask indicative of store size information. If the combined protection is set, a write access violation may be generated (the "Write Protected" signal of FIG. 3), leading to a software visible exception, i.e., an EPV. Thus the combined physical address may be used to check for memory protection associated with a memory location.

If instead a hit occurs and the requested data is not subject to protection, protection cache 210 outputs a permission signal (the "Write Permitted" signal of FIG. 3), indicating that the access may occur.

If the cache lookup output is not discarded, but either the store address is not in the cache tag array, or the check address does not match the DTLB/PTLB output, then a cache miss occurs. As a result, protection cache 210 may request a fill operation by sending a miss signal to PTLB 230, along with the necessary address information about the store request. PTLB 230 may then initiate a memory read of the requested cache-line in the corresponding protection record 275 in memory 270. The store operation will then re-access the memory pipeline upon completion of the cache-line fill (occurring on line 280).

If a PTLB lookup fails and protection is enabled for the requested page, a PTLB miss occurs. If a miss occurs in PTLB 230 (i.e., no translation to the physical address of the requested EMP record 275 is present), a PTLB miss signal is generated and sent to a protection miss handler (PMH) 240. PMH 240 may operate similarly to a page miss handler to cause a protection page walk to obtain the physical address corresponding to the EMP record desired. PMH 240 performs a protection-walk with the original request address.

Thus as shown, PMH 240 initiates a page walk in which various page tables may be accessed to obtain the desired physical address and provide it to PTLB 230 for storage. In the embodiment shown in FIG. 3, a three level paging hierarchy is present including a first paging structure 252, a second paging structure 254, and a third paging structure 256. Such page tables may correspond to a 64 bit virtual address, including a page map level 4 (PML4) table, a page directory pointer table, and a page directory. Accordingly, PMH 240 may provide an entry within a page table to PTLB 230. In turn this entry may be used, along with the byte offset provided by protection cache 210, to access the desired EMP record 275 within physical memory 270.

Of course, the actual protection walk state machine depends on the architectural selection of the protection walk algorithm. Upon completion of the protection walk, PTLB 230 may automatically initiate a cache fill operation for the critical cache-line desired for the current store operation. As described above, the store operation may be retried after the cache fill operation completes. Accordingly, PMH 240 may provide an entry within a page table to PTLB 230. In turn this entry may be used, along with the byte offset provided by protection cache 210, to access the desired EMP record 275 within physical memory 270.

In some embodiments, PTLB entries may be replaced either through explicit instructions or capacity replacement. While the corresponding cache-line need not be flushed, because a PTLB hit is a prerequisite to a cache hit, such flushing may improve cache efficiency. While shown with the particular structure in the embodiment of FIG. 3, in other embodiments, cache 210, DTLB 220, and PTLB 230 may be incorporated into a single memory structure.

Figure 4:
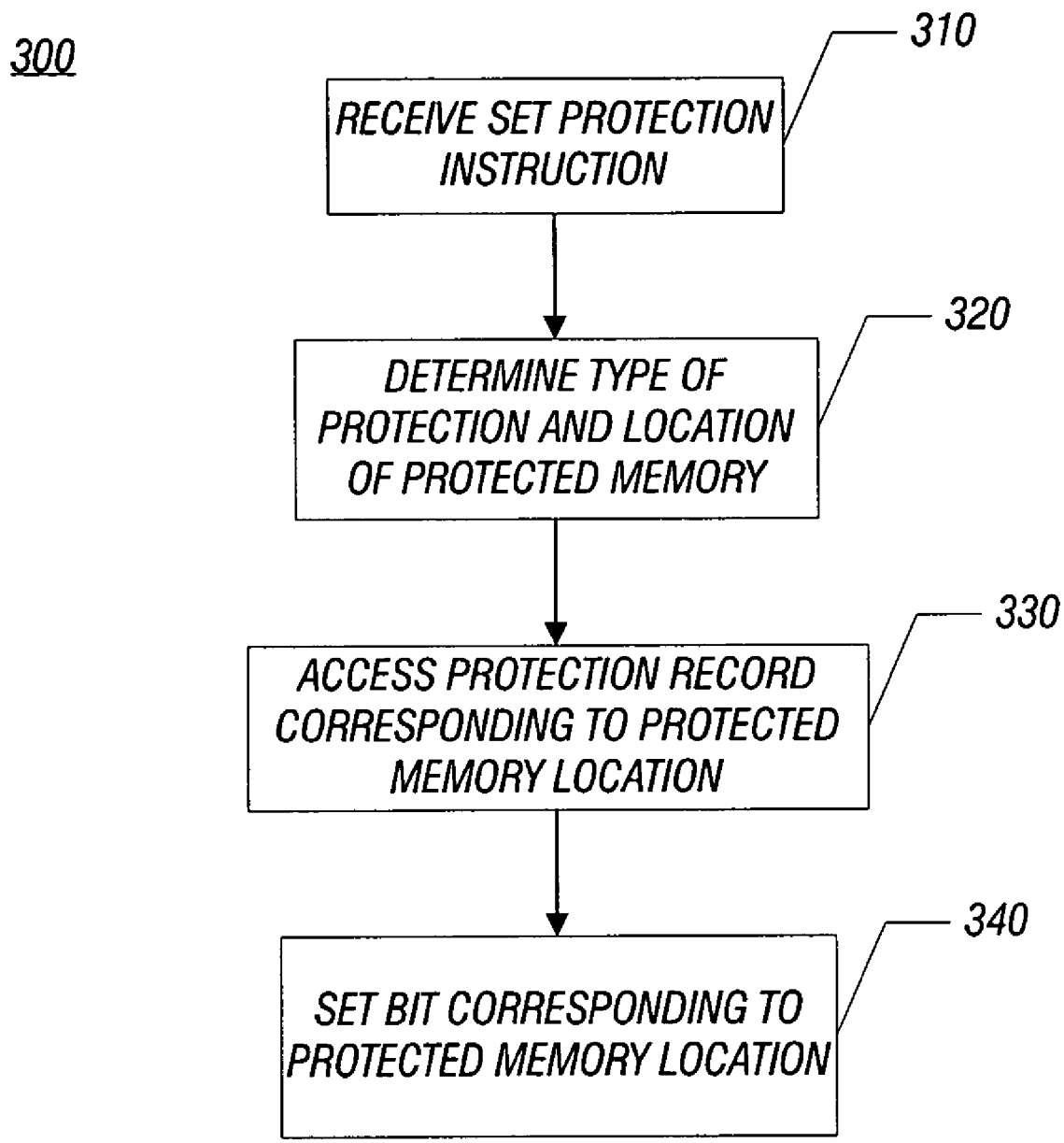
FIG. 4 is a flow diagram of a method in accordance with one embodiment of the present invention.

Referring now to FIG. 4, shown is a flow diagram of a method in accordance with one embodiment of the present invention. As shown in FIG. 4, method 300 may be used to provide memory protection to a given memory location. Method 300 may begin by receiving a set protection instruction (block 310). Such an instruction may be emitted by a compiler to enable protection of specified memory locations such as buffer headers to prevent a buffer overflow attack.

Next it may be determined the type of protection desired (e.g., read or write protection) and the location of the protected memory (block 320). For example, the location of a buffer header in the stack may be determined. Using this location information, a protection record corresponding to the memory location may be accessed (block 330). For example, this protection record may be stored in separate protection pages of system memory. Finally, a bit within the protection record may be set corresponding to the memory location (block 340). As an example, a protection record may be a vector having eight bits, each corresponding to a four byte segment of memory. Accordingly, the given bit corresponding to a four byte block including the buffer header may be set accordingly.

Figure 5:
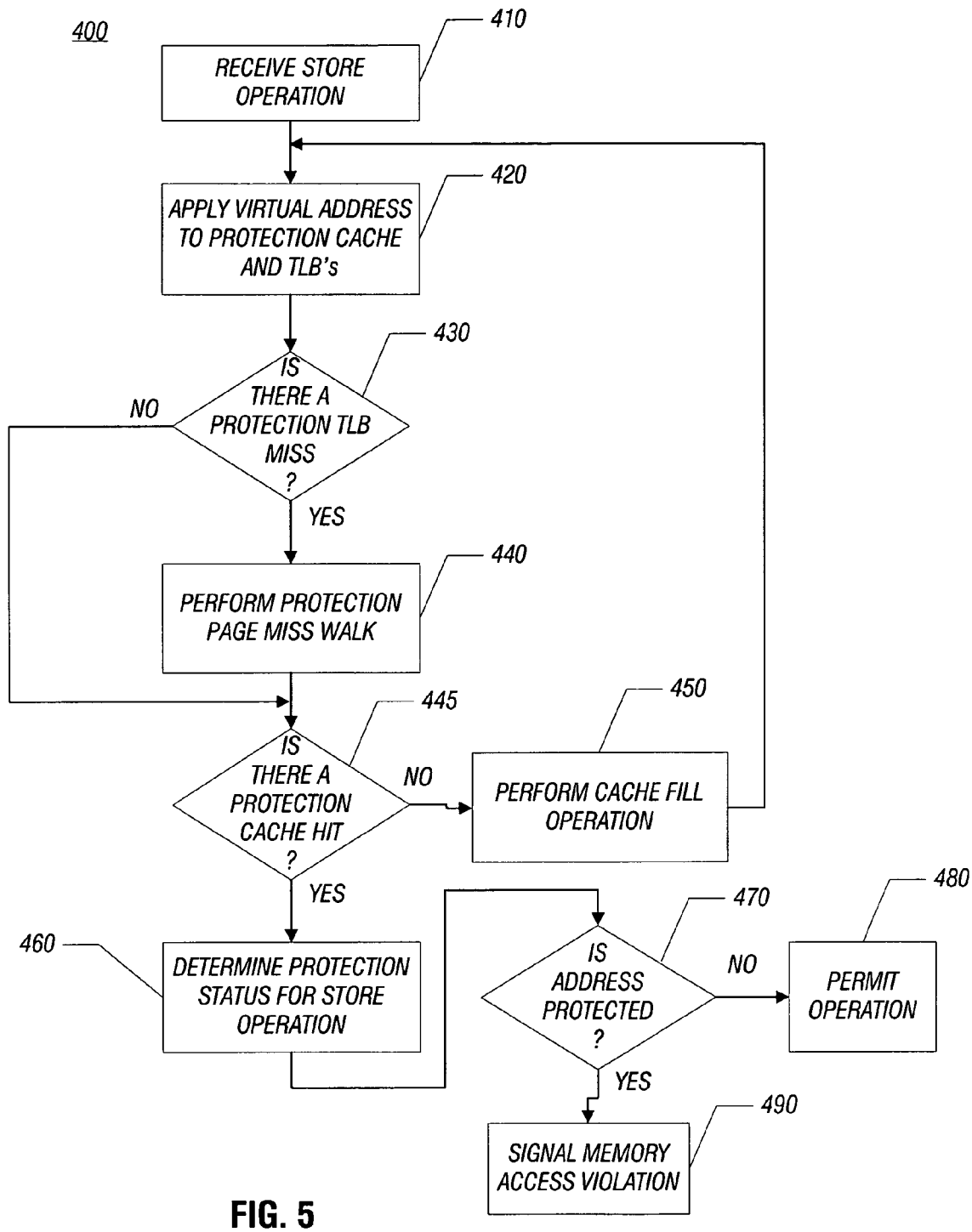
FIG. 5 is a flow diagram of a method in accordance with another embodiment of the present invention.

Referring now to FIG. 5, shown is a flow diagram of an implementation of extended memory protection using additional pipeline structures, such as that shown in FIG. 3. As shown in FIG. 5, method 400 may begin by receiving a store operation (block 410). The virtual address of the store operation may be applied to a protection cache and TLBs (e.g., a DTLB and a PTLB) (block 420).

Next it may be determined whether there is a protection TLB miss (diamond 430). If so, a protection page miss occurs and a protection page walk mechanism may be performed (block 440). If the protection TLB hits or upon completion of the page walk, next it may be determined whether there is a protection cache hit (diamond 445). If not, a cache fill operation may be performed (block 450), and control returns to block 420. As discussed above, the cache fill may obtain the desired protection record from system memory and provide it to the protection cache.

If instead at diamond 445 there is a protection cache hit, the protection status of the store operation may be determined (block 460). For example, the protection cache or other structure may perform a logical operation to determine whether one or more bits corresponding to the store operation are set, indicating a protected status. Thus it may be determined whether the address corresponding to the store operation is protected (diamond 470). If not, the operation may be permitted (block 480). If instead the address is protected, a memory access violation may be signaled (block 490).

In some embodiments, EMP in accordance with an embodiment of the present invention may provide runtime checking in hardware as a way to lessen the disastrous results from programming errors and ensure a controlled termination of a program with an exposed error. In such manner, better debug detection and validation may increase detection and coverage of errors before code release.

An EMP mechanism may check a program for unexpected behavior. As an example, such checks may include checking for accesses past the end of a variable, to unallocated memory locations, and to un-initialized memory locations. The checks are not limited to a specific language or subroutine. In addition, an EMP mechanism can be used to maintain integrity of key building blocks such as the heap by protecting key data.

In such manner, by providing micro-architectural support, memory protection may be implemented with minimal impact to the critical path of the memory pipeline in a pipelined general-purpose processor. Accordingly, the performance overhead of such protection is much less than a software based overwrite detection mechanism.

In such manner, software integrity may be improved. As one usage scenario, improved buffer overflow detection in data heap and stack structures may be effected. In the context of the data heap, a heap manager may use the protection mechanism to protect the block header of every buffer allocated. If a buffer overflow attack is attempted from one allocated block to the next, the protection mechanism will detect it and prevent the unwanted modification. Accordingly, buffer overflow and other over-write attacks can be prevented from occurring, rather than merely detecting the attack after the fact.

With compiler support, software vulnerabilities can be mitigated using memory protection in accordance with an embodiment of the present invention. For example, the fine-grain nature of protection records can be used to protect other static structures, like a virtual function table pointer, from being modified as part of an execution path re-direction attack. In some embodiments, a hardware canary can also be placed around statically allocated buffers that may be the source of an overflow.

In addition, protection records can be viewed as the limitless implementation of debug breakpoints. Instead of being limited by few available debug registers, a software developer will have as many simultaneous debug breakpoints as desired. Accordingly, fine grain breakpoint detection may be implemented for the whole address space. This detection thus provides a hardware approach to solving certain software integrity issues. That is, detection of unexpected behavior in applications can be achieved via breakpoint coverage, enabling a new programming methodology.

Figure 6:
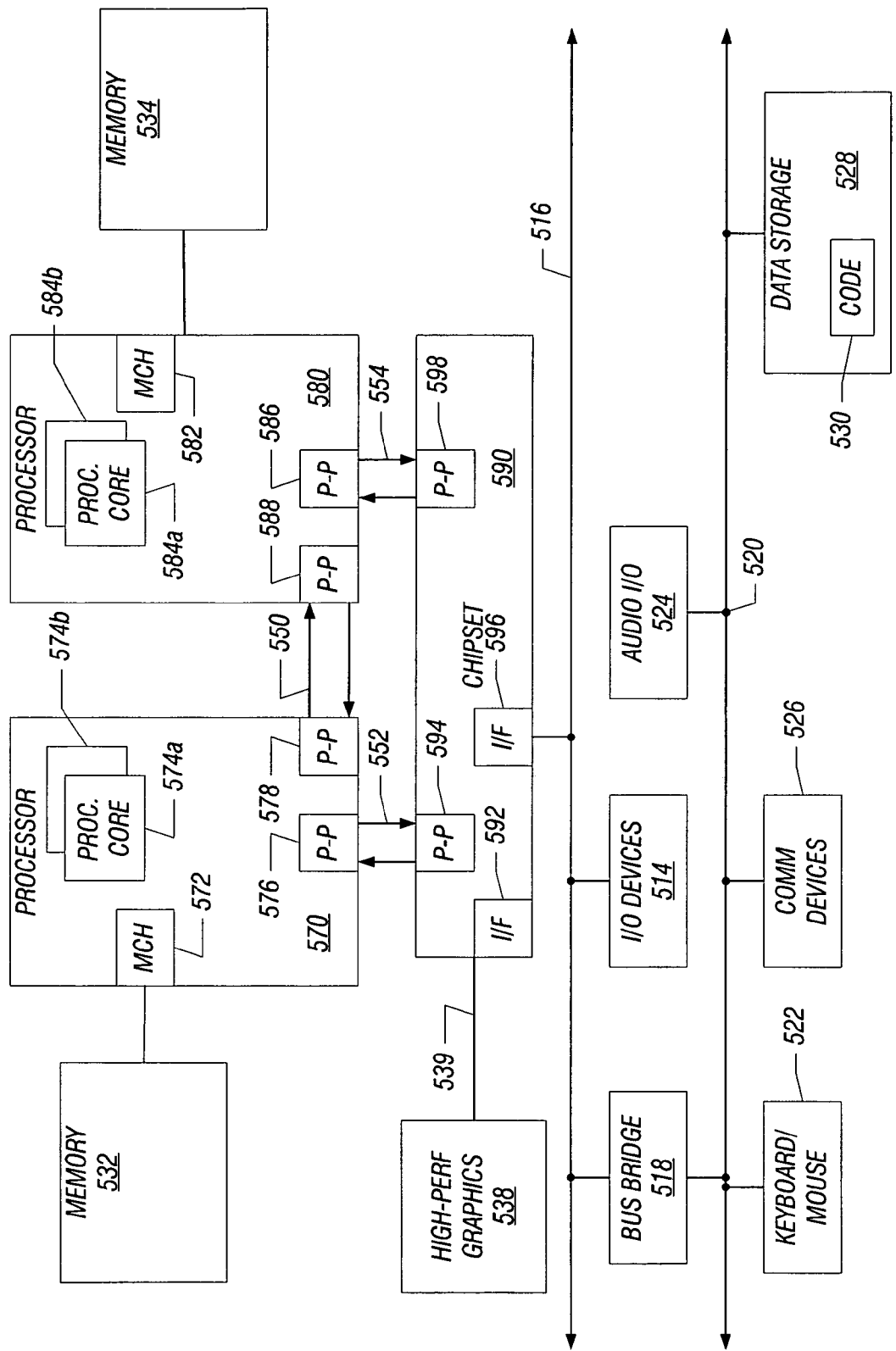
FIG. 6 is a block diagram of a system in accordance with one embodiment of the present invention.

Referring now to FIG. 6, shown is a block diagram of a system in accordance with an embodiment of the present invention. As shown in FIG. 6, the system is a multiprocessor system having a point-to-point bus architecture such as a common system interface (CSI) system, and includes a first processor 570 and a second processor 580 coupled via a point-to-point interconnect 550. First processor 570 includes multiple processor cores 574*a* and 574*b*, a memory controller hub (MCH) 572 and point-to-point (P-P) interfaces 576 and 578. Similarly, second processor 580 includes the same components, namely processor cores 584*a* and 584*b*, a MCH 582, and P-P interfaces 586 and 588.

As shown in FIG. 6, MCH's 572 and 582 couple the processors to respective memories, namely a memory 532 and a memory 534, which may be portions of main memory locally attached to the respective processors. First processor 570 and second processor 580 may be coupled to a chipset 590 via P-P interfaces 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 5, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation I/O interconnect bus, although the scope of the present invention is not so limited.

As shown in FIG. 6, various input/output (I/O) devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520. Of course, in other embodiments a system may be implemented differently, such as a single processor system or the like. Further, while shown with the particular implementation of FIG. 6, the scope of the present invention is not so limited and EMP may be implemented in different architectures.

Embodiments may be implemented in a computer program that may be stored on a storage medium having instructions to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first memory of a memory pipeline of the processor to store copies of protection vectors stored in a first portion of a second memory, wherein each of the protection vectors includes a plurality of bits, each of which is to identify a protection status of an addressable element of a second portion of the second memory, wherein the first portion of the second memory is inaccessible to a first software and the second portion of the second memory is accessible to the first software; and
a first buffer of the memory pipeline coupled to the first memory, the first buffer to store translations between a virtual address and a corresponding physical address, the first buffer to generate a hit signal and a miss signal and to provide the hit signal and an address to the first memory to cause the first memory to search for an entry corresponding to the address, wherein the first memory is to perform a logic operation on the protection vector of the entry to determine whether an operation on an addressable element of the second portion of the second memory is permitted, the first memory and the first buffer separate from a page translation mechanism of the processor.

2. The processor of claim 1, further comprising a protection miss handler to receive the miss signal and to obtain a requested protection vector from the second memory for storage in the first memory.

3. The processor of claim 1, further comprising a second buffer coupled to the first memory and the first buffer, the second buffer to store translations between a virtual address and a physical address of a corresponding portion of the second memory, wherein the translations of the first buffer include physical addresses of at least one of the protection records, the first and second buffers to be accessed in parallel responsive to an instruction when a protection indicator of a control register is set.

4. The processor of claim 3, wherein the first buffer and the second buffer comprise a single memory structure.

5. The processor of claim 1, wherein the first memory is to perform the logic operation on one or more of the copies of protection vectors to determine the protection status of an address of a store request.

6. The processor of claim 1, wherein the second portion of the second memory comprises at least one buffer header of a buffer in the second memory.

7. The processor of claim 1, wherein the first portion of the second memory comprises a protection page including protection vectors, the protection page segmented from data pages of the second portion of the second memory.

8. The processor of claim 1, wherein two bits of a corresponding protection vector are associated with each addressable element.

9. The processor of claim 8, wherein the two bits indicate one of read and write permitted, read and write not permitted, read permitted and write not permitted, and write permitted and read not permitted.

10. The processor of claim 8, where an instruction of a user application can modify a bit within a protection vector.

11. A hardware processor comprising:
a plurality of processor cores each including a memory pipeline having a protection cache to store copies of protection vectors stored in a first portion of a system memory, wherein each of the protection vectors includes a plurality of bits, each of which is to identify a protection status of an addressable element of a second portion of the system memory, and a protection translation lookaside buffer (TLB) coupled to the protection cache, the protection TLB to store translations between a virtual address and a corresponding physical address, the protection TLB to generate a hit signal and a miss signal and to provide the hit signal and an address to the protection cache to cause the protection cache to search for an entry corresponding to the address, the protection cache and the protection TLB separate from a page translation mechanism of the processor, wherein the protection cache is to perform a logic operation on the protection vector of the entry to determine whether an operation on an addressable element of the second portion of the system memory is permitted; and a memory controller coupled to the plurality of cores to couple the plurality of cores to the system memory.

12. The hardware processor of claim 11, further comprising a protection miss handler to receive the miss signal and to obtain a requested protection vector from the system memory for storage in the protection cache.

13. The hardware processor of claim 11, further comprising a data TLB coupled to the first memory and the protection TLB, the data TLB to store translations between a virtual address and a physical address of a corresponding portion of the system memory, wherein the translations of the protection TLB include physical addresses of at least one of the protection records, the protection and data TLBs to be accessed in parallel responsive to an instruction when a protection indicator of a control register is set.

14. The hardware processor of claim 13, wherein the protection TLB and the data TLB comprise a single memory structure.

15. The hardware processor of claim 11, wherein the second portion of the system memory comprises at least one buffer header of a buffer in the system memory.

16. The hardware processor of claim 11, wherein two bits of a corresponding protection vector are associated with each addressable element.

17. The hardware processor of claim 16, wherein the two bits indicate one of read and write permitted, read and write not permitted, read permitted and write not permitted, and write permitted and read not permitted.

18. The processor of claim 11, wherein an instruction of a user application can modify a bit with a protection vector.

19. A system comprising:
a processor including a plurality of processor cores each including a memory pipeline having a protection cache to store copies of protection vectors stored in a first portion of a system memory, wherein each of the protection vectors includes a plurality of bits, each of which is to identify a protection status of an addressable element of a second portion of the system memory, and a protection translation lookaside buffer (TLB) coupled to the protection cache, the protection TLB to store translations between a virtual address and a corresponding physical address, the protection TLB to generate a hit signal and a miss signal and to provide the hit signal and an address to the protection cache to cause the protection cache to search for an entry corresponding to the address, the protection cache and the protection TLB separate from a page translation mechanism of the processor, wherein the protection cache is to perform a logic operation on the protection vector of the entry to determine whether an operation on an addressable element of the second portion of the system memory is permitted, and a memory controller coupled to the plurality of cores to couple the plurality of cores to the system memory; and
the system memory coupled to the processor, wherein the system memory comprises a dynamic random access memory (DRAM).

20. The system of claim 19, further comprising a data TLB coupled to the first memory and the protection TLB, the data TLB to store translations between a virtual address and a physical address of a corresponding portion of the system memory, wherein the translations of the protection TLB include physical addresses of at least one of the protection records, the protection and data TLBs to be accessed in parallel responsive to an instruction when a protection indicator of a control register is set.

21. The system of claim 19, wherein two bits of a corresponding protection vector are associated with each addressable element, and the two bits indicate one of read and write permitted, read and write not permitted, read permitted and write not permitted, and write permitted and read not permitted.

* * * * *